Oct. 18, 1966  L. R. BRADSHAW, JR., ETAL  3,280,230
METHOD OF FORMING LIGHTWEIGHT MATERIAL
Filed Aug. 13, 1965
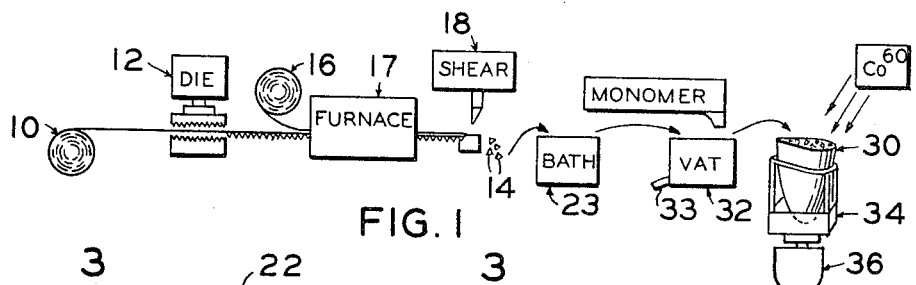
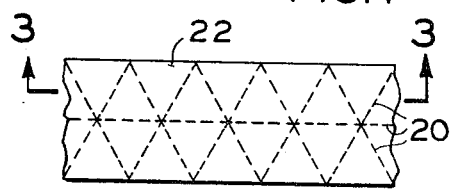
FIG. 2
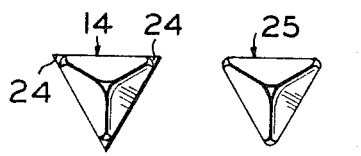
FIG. 4   FIG. 5
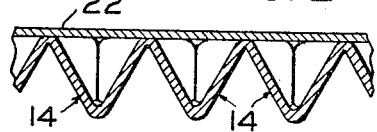
FIG. 3
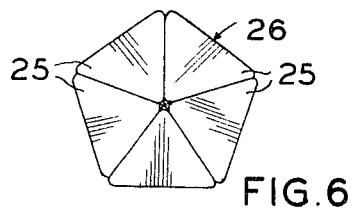
FIG. 6
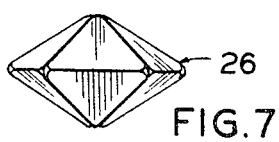
FIG. 7
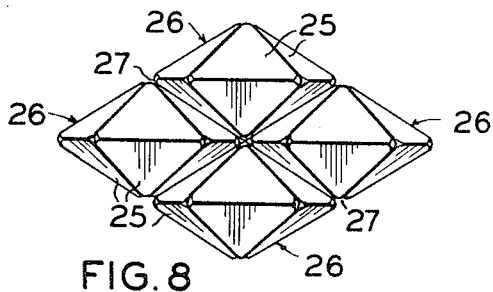
FIG. 8
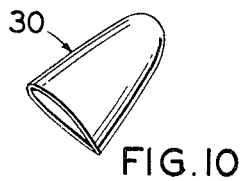
FIG. 10
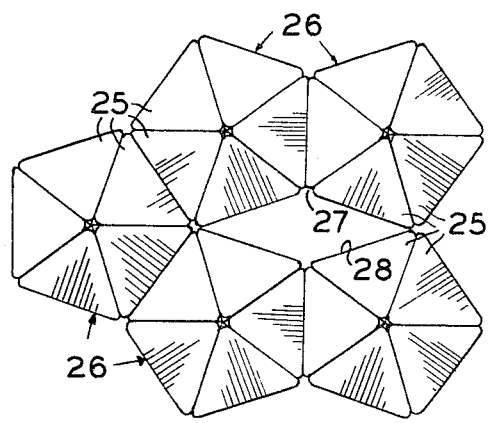
FIG. 9
LAWRENCE R. BRADSHAW, JR.
JACOB B. RIVERS, JR.
INVENTORS.
BY
Robert K. Rhea
AGENT United States Patent Office 3,280,230
Patented Oct. 18, 1966

3,280,230
METHOD OF FORMING LIGHTWEIGHT
MATERIAL
Lawrence R. Bradshaw, Jr., 1233 NW. 82, and Jacob B. Rivers, Jr., 10600 White Haven Road, both of Oklahoma City, Okla.
Filed Aug. 13, 1965, Ser. No. 479,381
9 Claims. (Cl. 264—22)

The present invention is a continuation-in-part of our copending application filed in the United States Patent Office on November 1, 1962, Ser. No. 234,804, for Method of Forming Lightweight Material, and now abandoned.

The present invention relates to materials and more particularly to a method of mold forming a lightweight material.

The prior art reveals a number of methods of forming lightweight materials, such as foamed aluminum, honeycombed structure and expansion of a polymeric body by irradiation and heat. Materials formed by the above methods or processes are satisfactory for the purposes disclosed but they do not result in forming a material as light in weight as applicants' which may be molded in a desired shape and, when finished, forms a rigid high strength structure.

Lightweight yet rigid high strength material formed in accordance with the present invention has many applications such as the forming of aircraft wing tips, airfoils, space platforms and vehicle bodies.

It is, therefore, the principal object of the present invention to set forth a manner or method of forming lightweight yet rigid high strength material.

Another object is to form a lightweight material from a plurality of uniformly sized relatively small hollow particles.

Still another object is to form a material of hollow lightweight particles which are arranged in substantially contiguous contact with each other, on their respective adjacent sides and edges, and are bonded together by polymerizing a monomer.

A further object is to provide a material of this class which is in part formed from thin sheet material such as plastic, aluminum, titanium, or other metallic materials.

A further object is to provide a low density lightweight material formed by bonding a plurality of relatively small particles together wherein the particles are preferably tetrahedron shaped.

The terahedron shaped particles, forming the material as hereinafter described, enhances its resistance to buckling and resists internal shear by deflecting the shear stress or force because of asymmetry rather than shearing along any neutral bending plane within the material, such as is characteristic of articles formed of honeycomb or other similar cellular-like structure. The material formed is characterized by multiplaned truss structure.

Yet another object is to provide a method of forming lightweight material from preferably tetrahedron shaped particles wherein a mold filling slurry is formed by the particles and a monomer.

The present invention accomplishes these and other objects by forming a plurality of relatively small tetrahedron shaped particles of thin sheet material. The particles are mixed with a monomer and oriented with respect to each other within a mold. The monomer is then polymerized by irradiation.

Other objects will be apparent from the following description when taken in conjunction with the accompanying one sheet of drawings, wherein:

FIGURE 1 is a diagrammatic view illustrating the method and apparatus used;

FIGURE 2 is a fragmentary plan view, to an enlarged scale, of one surface of sheet material forming one side of tetrahedron shaped particles;

FIGURE 3 is a vertical cross-sectional view taken substantially along the line 3—3 of FIG. 2;

FIGURE 4 is a side elevational view of one of the particles, per se;

FIGURE 5 is a final form of one of the particles;

FIGURE 6 is a top view of a plurality of the particles illustrating the shape of units formed thereby;

FIGURE 7 is a side elevational view of FIG. 6;

FIGURE 8 is a side elevational view illustrating the relative position of a plurality of the units of FIG. 6;

FIGURE 9 is a top plan view illustrating a plurality of the units of FIG. 6 when disposed in edge to edge relation; and, FIGURE 10 is a perspective view of a wing tip forming a mold to be filled by the material.

Like characters of reference designate like parts in those figures of the drawings in which they occur.

In the drawings:

The reference numeral 10 indicates a roll of selected sheet material, an alloy of aluminum and magnesium or plastic, which is progressively moved through a shaping device or die 12 which draws or expands the sheet material 10 to define three sides of tetrahedron shaped particles 14 (FIG. 3). A second roll of similar sheet material 16 is placed on the formed sheet 10 and is bonded or brazed thereto, in a furnace 17, in contiguous contact with the upwardly disposed surface of the material 10, as seen in FIG. 3, which covers and closes the indentations in the material 10 and forms the fourth surface of the tetrahedron shaped particles 14. The sheet material 10 and 16 is then passed through a suitable shearing device 18 which separates the particles 14 by cutting through the two sheets along the dotted lines 20 of FIG. 2. This results in a plurality of tetrahedron shaped particles 14, each having a side or surface 22, formed by the sheet 16, wherein each apex of the triangular shaped side 22 projects outwardly of the respective adjacent face or surface of the other three sides of the tetrahedron formed by the sheet 10, as at 24 (FIG. 4).

The particles 14 are preferably relatively small, when compared with the overall dimension of an article being formed such as an airplane wing tip. The size of the particles is not critical and may be varied, as desired, but the particles must be substantially uniform in size in accordance with manufacturing limits and the size of article being formed.

The particles 14, when formed from aluminum, are immersed, at room temperature (78° F.), and agitated in a bath of 5% nitric acid, as at 23, or some other suitable etching solution, such as sodium hydroxide, not shown, which etches or dissolves, by chemical action, the tips or apexes 24 from the surface 22 resulting in tetrahedron shaped particles 25 having rounded apexes as shown by FIG. 5. Obviously, the outer surfaces of the particles forming the respective sides of the tetrahedron shape will also be etched which reduces the wall thickness. Etching the outer surfaces of the particles results in roughening the surfaces which enhances the ability of a monomer to adhere more securely to the surfaces of the particles as hereinafter described. The etching action is best controlled by visual inspection of random samples of the particles in the bath. The etching action is stopped by draining off the acid and washing the particles with fresh water.

The hollow tetrahedron shape, with rounded apexes, is essential to carrying out the invention for the reasons that it renders the particles more easily oriented with respect to each other and the inner surfaces of a mold. When oriented to a maximum density the particles form pentagonal-like units or structures 26 in plan view (FIG.

6) and substantially diamond shaped when viewed in side elevation (FIG. 7) and define a small void, as at 27, at the juncture of the apexes of the particles and larger openings between adjacent surfaces of the pentagonal units, as at 28 (FIG. 9).

A polymerizable monomer forms a film on the particle surfaces to join the units together and form fillets at the juncture of the particles forming the voids 27 or openings 28.

In forming the desired material, as for example, in forming an aircraft wing tip, sheet or wing tip "skin" material was drawn over a die and joined at its respective edges, in a conventional manner, to form the shape of the wing tip. The "skin" of the wing tip thus formed a mold 30 to be filled by the monomer and particles 25.

A quantity of the particles 25 were mixed in a vat 32 with a monomer, methyl-methacrylate

$$CH_2:CMe.Co_2Me$$

not shown, in liquid form to coat all the surfaces of the particles and form a slurry. Excess monomer was drawn off by a drain pipe 33 and the coated particles were poured into the mold 30. The monomer used must be of low viscosity, and if methyl-methacrylate is used it may be thinned with methanol, if necessary, to permit orientation of the particles as described hereinbelow. If plastic sheet material is used to form the particles 25 then a bonding agent such as acrylic may be used. The mold 30 as supported, in an upright manner, by a jig 34 or the like. The quantity of the particles used is a ratio of the mold volume and the sum of the volume of the particles. The quantity of monomer initially used is the amount required to immerse the particles 25 to insure that all surfaces thereof are coated. The quantity of particles used was the amount required to fill the mold 30 as disclosed hereinabove. The mold 30 may be provided with one or more drains or weep holes should excess monomer accumulate.

The mold was then vibrated by a mechanical vibrator 36 until substantially all the particles 25 were settled within the confines of the mold to align or orient the particles 25 so that the sides or edges of the particles contiguously contacted the inner surface of the mold or respective surfaces of adjacent surrounding particles. The monomer film acts as a lubricant and in combination with the rounded apexes, enhances the orientation of the particles. Any suitable vibrator may be used. The speed and amplitude of vibration may be varied as determined best for the size of particles 25 employed. The duration of vibration is best determined by the operator, after a little experience, in visually observing the particles 25, from a piled up to a settled condition, at the substantially level open end of the mold 30. It is desirable that all of the particles 25 be oriented as illustrated in FIG. 8 but in practice some of the particles will be disoriented. Voids created by such disorientation were of less dimension than the volume of one of the particles and did not adversely affect the orientation of the remaining particles.

The monomer was irradiated 24 hours, at room temperature (78° F.), from a suitable preferably high intensity source, such as Cobalt 60, so that the center of the mass received a dose rate of $10^5$ rads/hr. for initiating polymerization of the monomer. Monomer polymerization occurs in three steps: chain initiation, propagation and termination. A low intensity radiation will trigger the initiation step and polymerization will continue independently. However, at a high intensity radiation the concentration of growing chains is much larger which increases the ability of the chains to react with each other. The monomer, methyl-methacrylate, when polymerized forms lucite. Other polymerizable material may be used, for example, liquid vinyl plastisol which is polymerized by baking at 320° F. for 8 to 24 hours.

After irradiation and polymerization the material filled finished wing tip or mold 30 was removed from the radiation source.

Obviously, the invention is susceptible to some change or alteration without defeating its practicability, and we therefore do not wish to be confined to the preferred embodiment shown in the drawings and described herein, further than we are limited by the scope of the appended claims.

We claim:

1. A method of forming a lightweight material, comprising the steps of: providing a quantity of tetrahedron shaped particles having rounded apexes; mixing the particles with a monomer to form a slurry; pouring the slurry into a mold; vibrating the mold to orient the particles to a maximum density; and initiating polymerization of the monomer by irradiation at a dose rate of about $10^5$ rads/hr.

2. A method of forming a lightweight material, comprising the steps of: providing a quantity of tetrahedron shaped particles with methyl-methacrylate to form a slurry; filling a mold with the slurry; vibrating the mold to orient the particles to a maximum density while simultaneously draining off excess methyl-methacrylate; and polymerizing the methyl-methacrylate by irradiation at a dose rate of about $10^5$ rads/hr. for 8 to 24 hours.

3. A method of forming a lightweight material, comprising the steps of: providing a quantity of tetrahedron shaped thin walled particles having rounded apexes; mixing the particles with liquid vinyl plastisol to form a slurry; filling the mold with the slurry; vibrating the mold to orient the particles to a maximum density while simultaneosuly draining off excess liquid vinyl plastisol; and baking the particles at 320° F. for 8 to 24 hours to polymerize the liquid vinyl plastisol.

4. A method of filling a mold with rigid lightweight material, comprising the steps of: providing a relatively thin walled mold; providing tetrahedron shaped thin walled particles having rounded apexes in quantity substantially equal to the volume of the mold; mixing the particles with methyl-methacrylate in sufficient quantity to coat the particle surfaces; filling the mold with the coated particles; vibrating the mold to orient the particles to a maximum density while simultaneously draining off any excess methyl-methacrylate; and polymerizing the methyl-methacrylate by irradiation at a dose rate of about $10^5$ rads/hr. for 8 to 24 hours.

5. A method of forming a lightweight material, comprising the steps of: providing a quantity of thin walled hollow tetrahedron shaped particles, each having rounded apexes; mixing the particles with methyl-methacrylate to coat the particles; placing the particles within a mold; vibrating the mold to orient the particles to a maximum density; and polymerizing the methyl-methacrylate by irradiation at a radiation dosage of about five megarads for 8 to 24 hours at room temperature to polymerize the methyl-methacrylate.

6. A method of forming a lightweight material, comprising the steps of: providing a quantity of tetrahedron shaped thin walled hollow particles having rounded apexes; mixing the particles with an excess of methyl-methacrylate to coat the particles and form a slurry in quantity greater than the volume of a mold to be filled; draining off excess methyl-methacrylate; filling a mold with the coated particles; vibrating the mold to orient the particles to a maximum density; and polymerizing the methyl-methacrylate by irradiation at a radiation dosage of five megarads at 78° F.

7. A method of forming a lightweight material, comprising: providing a sheet of thin material; deforming the sheet material to form a plurality of recesses defining three sides of tetrahedron shaped particles; bonding a second similar sheet of thin material to the first named sheet for closing the openings defining the recesses; shearing both sheets to separate the particles; mixing the particles with a monomer to coat the particle surfaces; filling a mold with the coated particles; vibrating the mold to orient the particles to a maximum density; and polymerizing the monomer by irradiation at room temperature at a radiation dosage of about five megarads/hr. for 8 to 24 hours.

8. A method of forming a lightweight material, comprising: providing a sheet of thin material; deforming the sheet material to form a plurality of recesses defining three sides of tetrahderon shaped particles; bonding a second sheet of thin material to the first named sheet for closing the openings defining the recesses; shearing both sheets to separate the particles; mixing the particles with methyl-methacrylate to coat the particle surfaces; filling a mold with the coated particles; vibrating the mold to orient the particles to a maximum density; and polymerizing the methyl-methacrylate by irradiation at room temperature at a radiation dosage of about five megarads/hr. for 8 to 24 hours.

9. A method of forming a lightweight material, comprising: providing a sheet of thin material; deforming the sheet material to form a plurality of recesses each defining three sides of tetrahedron shaped particles; bonding a second similar sheet of thin material to the first named sheet for closing the openings defining the recesses and forming the fourth side of the tetrahedron shaped particles; shearing both sheets to separate the particles; removing the apexes of the material forming the fourth side by etching the particles; mixing the particles with a monomer to coat the particle surfaces; draining off excess monomer; filling a mold with the coated particles; vibrating the mold to orient the particles to a maximum density; and polymerizing the monomer by irradiation at a radiation dosage of about five megarads/hr. at 78° F. for 8 to 24 hours.

References Cited by the Examiner

UNITED STATES PATENTS

| | | | |
|---|---|---|---|
| 2,593,714 | 4/1952 | Robinson | 161—139 XR |
| 2,615,271 | 10/1952 | Ulmer et al. | 264—73 XR |
| 2,806,509 | 9/1957 | Bozzacco et al. | 264—109 XR |
| 3,010,158 | 11/1961 | Broderson | 264—71 |
| 3,027,694 | 4/1962 | Adler | 25—41 XR |
| 3,086,899 | 4/1963 | Smith et al. | 161—131 |

OTHER REFERENCES

Society of the Plastics Industry. Plastics Engineering Handbook. New York, Reinhold, 1954, pp. 237–246.

ALEXANDER H. BRODMERKEL, *Primary Examiner.*

P. E. ANDERSON *Assistant Examiner.*